(12) United States Patent
Falwell

(10) Patent No.: US 7,992,524 B2
(45) Date of Patent: Aug. 9, 2011

(54) CAT CAN'T JUMP—DEVICE FOR TRAINING SMALL ANIMALS

(76) Inventor: Maureen D. Falwell, Austin, TX (US)

(*) Notice: Subject to any disclaimer, the term of this patent is extended or adjusted under 35 U.S.C. 154(b) by 0 days.

(21) Appl. No.: 12/394,188

(22) Filed: Feb. 27, 2009

(65) Prior Publication Data

US 2009/0194039 A1 Aug. 6, 2009

Related U.S. Application Data

(63) Continuation-in-part of application No. 10/336,370, filed on Jan. 3, 2003, now abandoned.

(51) Int. Cl.
*A01K 27/00* (2006.01)
(52) U.S. Cl. ......... 119/795; 119/784; 119/785; 119/769
(58) Field of Classification Search .................. 119/795, 119/712, 721, 726, 758, 771, 782, 816, 784, 119/785, 769, 786, 787, 791, 792, 770, 793, 119/780, 839, 905, 702, 713; D30/154, 151, D30/160
See application file for complete search history.

(56) References Cited

U.S. PATENT DOCUMENTS

| | | | | |
|---|---|---|---|---|
| 160,134 A * | 2/1875 | Wilson | ........................ | 119/758 |
| 207,963 A * | 9/1878 | Hallner et al. | ................ | 119/758 |
| 229,691 A * | 7/1880 | Gerard | .......................... | 119/758 |
| 283,240 A * | 8/1883 | Heaton | ......................... | 119/758 |
| 427,012 A * | 4/1890 | Reed | ............................ | 119/788 |
| 704,730 A * | 7/1902 | Zierleyn | ....................... | 119/769 |
| 753,835 A * | 3/1904 | Albee | ............................ | 119/769 |
| 800,260 A * | 9/1905 | Bellstedt | ...................... | 119/769 |
| 843,543 A * | 2/1907 | Matsumoto | .................. | 119/769 |
| 1,738,581 A * | 12/1929 | Hodgson | ...................... | 119/770 |
| 2,232,163 A * | 2/1941 | Brecht | ......................... | 119/770 |
| 5,456,214 A * | 10/1995 | Quilling | ....................... | 119/795 |
| D365,177 S * | 12/1995 | Farrell | ........................ | D30/154 |
| 5,785,007 A * | 7/1998 | Sauber et al. | ................ | 119/771 |
| 5,870,974 A * | 2/1999 | Johnson | ....................... | 119/786 |
| 5,894,748 A * | 4/1999 | Capperrune | ..................... | 70/16 |
| 6,164,245 A * | 12/2000 | Johnson | ....................... | 119/712 |
| 6,412,442 B1 * | 7/2002 | Bean | ............................ | 119/701 |
| 6,435,137 B1 * | 8/2002 | Hourihan | ...................... | 119/788 |
| 6,499,436 B1 * | 12/2002 | Capperrune | ................. | 119/792 |
| 6,536,376 B2 * | 3/2003 | Brown | ......................... | 119/769 |
| 6,578,528 B1 * | 6/2003 | Brown | ......................... | 119/769 |
| 2002/0117119 A1 * | 8/2002 | Brown | ......................... | 119/795 |
| 2007/0084417 A1 * | 4/2007 | Falwell | ........................ | 119/795 |

FOREIGN PATENT DOCUMENTS

DE 03510668 * 9/1986

* cited by examiner

*Primary Examiner* — Andrea M Valenti
(74) *Attorney, Agent, or Firm* — Moster, Wynne & Ressler, P.C.

(57) ABSTRACT

An animal training device and restraint (10) is comprised of a lead (14) having a length greater than the height of the cat and less than the length of the cat and a device (12) for attaching to the cat's collar or harness on one end and a weight (13), light enough to lift into the air and swing freely when the cat jumps, attached to the other end to provide the animal with some free roaming ability while preventing them from jumping onto furniture or over fences or after birds.

3 Claims, 4 Drawing Sheets

CAT CAN'T JUMP—DEVICE FOR TRAINING SMALL ANIMALS

CROSS REFERENCE TO RELATED APPLICATIONS

This application is a Continuation-In-Part of regular utility patent application Ser. No. 10/336,370 filed on Jan. 3, 2003, now abandoned of the same title and by the same inventor, the disclosure of which is incorporated herein by reference.

FIELD OF THE DISCLOSURE

This disclosure relates to pet restraints and in particular to a device selectively attachable to a cat collar or harness and used to train cats not to jump over fences or onto or into areas from which the pet owner wishes to restrict the cat.

BACKGROUND

A wide variety of pet training and restraining devices are found in the art. For example, U.S. Pat. No. 6,412,442 to Bean; U.S. Pat. No. 6,164,245 to Johnson; U.S. Pat. No. 229,691 to Gerard; U.S. Pat. No. 207,963 to Hallner and Lindquist; U.S. Pat. No. 160,134 to Wilson; U.S. Pat. No. 843,543 to Matsumoto; U.S. Pat. No. 800,260 to Bellstedt are all illustrative of prior art. While these units may be suitable for the purposes for which they were designed, they would not be suitable for the purposes of the present invention. Several types of animal restraints have been proposed and they can be grouped into four categories. First there is prior art such as Des 365177 to Farrell which requires that one end of the connecting cable be able to be fixed in one place, such as to a stake or post. Secondly, there is prior art such as U.S. Pat. No. 160,134 to Wilson that requires that a fence or wire is set up with specific dimensions in order for the main component to function. The third category of prior art is demonstrated by U.S. Pat. No. 843,543 to Matsumoto. This third category uses a weight on the end of the cable, but the weight is designed in such a way as to make the device immovable by the animal, after being deployed. The fourth category of prior art is exemplified by U.S. Pat. No. 6,412,442 to Bean that uses the Animal's/retrainee's own weight as the anchor for the device. Again, this fourth category is not intended to be moveable by the animal after it is deployed. A deeper look at more prior art for each category is included below.

As mentioned above, the first category of restraints in the prior art have an immovable, stationary end. These restrict the animals overall movement and enable tangling in objects within the reach of the cabling. Several devices with a fixed end have been proposed—for example, U.S. Pat. No. 427,012 to Reed; Des 365177 to Farrell; DE3510668 A1 to Berger; U.S. Pat. No. 5,785,007 to Sauber et al; U.S. Pat. No. 6,435,137 B1 to Hourihan. These devices have the cable fixed to a permanent object on one end, thus restricting the animals overall movement and enabling tangling in objects within the reach of the cable. Further, these devices may be portable to the location of use, but once deployed for use, are intended to remain stationary. This differs from the present invention, Cat Can't Jump, in that Cat Can't Jump is intended to allow the restrained pet movement in all horizontal directions with out a radial distance boundary from an initial fixed point. This difference is highlighted in U.S. Pat. No. 427,012 to Reed, where Reed teaches that his "Hitching Post" can be "located on the surface of the ground or entirely embedded within the earth". Reed's device was intended to be immobile, once deployed. Des 365177 to Farrell teaches of an anchor to secure the animal to a single point. DE3510668 A1 to Berger is a German language patent that shows clear intent for the sow-restraining device to be attached to a stake or other permanently affixed location. In U.S. Pat. No. 5,785,007 to Sauber et al, Sauber teaches of a device to connect an animal to a fixed point within a vehicle for transportation. Sauber's device is not intended for, and cannot be used for, allowing free horizontal movement without a device set radius. U.S. Pat. No. 6,435,137 B1 to Hourihan teaches of a restraint device for embedding in the lawn. Once deployed, Hourihan's device is immovable by the animal.

Devices comprising the second category of prior art feature weights on a connector with a specific enclosure. These devices require a separate structure of fencing or wires in order to function and limit the animal's horizontal movements. Several devices of this nature have been proposed as well—for example, U.S. Pat. No. 160,134 to Wilson; and U.S. Pat. No 229,691 to Gerard. This second category is exemplified by U.S. Pat. No. 160,134 to Wilson. Wilson teaches of a device with a piece of equipment pulled on a connector by the restrained animal that catches on a pre-strung wire providing a set boundary for the animal. This device is only for use out doors and can only be deployed for use after the wire is first in place. U.S. Pat. No. 229,691 to Gerard also uses a connected weight and a low strung wire fence. Gerard teaches of a weight attached to the bridle of a horse that the horse is able to pull but is intended to stay on the ground. To achieve this Gerard demonstrates a weight heavy enough not to leave the ground and a cable that is significantly longer than the length or height of the horse. These devices in the second category differ from the present invention, Cat Can't Jump, in many ways. Firstly, and mainly, the present invention does not require any construction of a retaining wire or fence. Further, with out the pre-existing retaining wire, Cat Can't Jump does not require that the trailing weight get caught on anything in order to perform its function. Indeed, it is designed not to snag on other features. Gerard, for example, requires a cable longer than the length of the animal so that it cannot lift the weight, while Cat Can't Jump uses a cable shorter than the length of the cat so that the weight will leave the ground when it tries to stand or jump. Cat Can't Jump can be used inside of homes or other buildings while prior art of this category is strictly for use outdoors. Cat Can't Jump deters vertical motion by disturbing the cat's balance after the front paws leave the ground, but doesn't limit horizontal movement.

Devices comprising the third category of prior art for consideration feature weights and no specific enclosure. However, it will be demonstrated that these were intended to be immobile after deployment. Several devices of this nature have been proposed as well—for example, U.S. Pat. No. 843,543 to Matsumoto; U.S. Pat. No. 704,730 to Zierleyn; U.S. Pat. No. 753,835 to Albee; U.S. Pat. No. 1,738,581 to Hodgson; U.S. Pat. No. 5,870,974 to Johnson; U.S. Pat. No. 6,536,376 to Brown; U.S. Pat. No. 6,578,528 B1 to Brown and U.S. Pat. No. 5,456,214 to Quilling. These devices are designed to substitute for fixed end restraints for instances where a suitable stationary object isn't present. That is, these devices are portable to the location of use, but once a unit is deployed for use, it is intended to remain stationary. This differs from Cat Can't Jump in that Cat Can't Jump is intended to allow the pet movement in all horizontal directions with out a radial distance boundary from an initial fixed point. This difference is highlighted in U.S. Pat. No. 843,543 to Matsumoto where, on line 10 of the application, Matsumoto states that the hitching weight is "to keep them at a given place". U.S. Pat. No. 704,730 to Zierleyn teaches of a hitching weight, with rubber casing to deaden the sound of dropping it onto a curb. As Zierleyn teaches of an embodiment of a hitching weight, it is by definition intended for stationary use, once deployed. Zierleyn is to be used to keep the animal at a curbside. U.S. Pat. No. 753,835 to Albee is a "Holder for Hitching Weights". Albee teaches of a device to be used to secure the hitching weight for transportation inside a vehicle. In U.S. Pat. No. 1,738,581 to Hodgson, Hodgson teaches that the "Child's Tether" would be "sufficiently heavy not to be pulled about", in lines 9 through 10. In U.S. Pat. No. 5,870,974, Johnson teaches of a device to replace stakes in the ground as a central point for connecting and restraining an animal. In Line 33 of Section 1, Johnson's states that the "Animal Anchor" may be "easily moved from one location to another". However, this refers to re-deploying the device, not its movement after deployed. Further, in the abstract Johnson teaches that the weight of the device is distributed to prevent it from tipping by the animal. Johnson's device described in U.S. Pat. No. 5,870.974 is not intended to be moveable by the animal. U.S. Pat. No. 6,536,376 B2, Publication Number U.S. 2002/0117119A1 and U.S. Pat. No. 6,578,528 B1 are all issued to the same person, Brown. U.S. Pat. No. 6,536,376 B2, Publication Number US 2002/0117119A1 and U.S. Pat. No. 6,578,528 B1 teach of essentially the same device with slightly different embodiments. The difference between these three and Cat Can't Jump is highlighted in U.S. Pat. No. 6,536,376 B2 where the device is referred to as a "fixed platform" on many occasions. Brown teaches of a device that is transportable and applicable in many settings, but is always intended to remain immobile after deployment. U.S. Pat. No. 5,456,214 to Quilling teaches of "Tether Balls and Leash for Tether Pets". Quilling describes the device as an anchor many times. Specifically, Quilling states in Column 5, Lines 25 through 26"drop the device down wherever you want the pet to remain". In this regard the present invention substantially departs from the conventional concepts and designs of the prior art. Cat Can't Jump will not require that the pet remain in one location and is, indeed, developed with the intention that the pet can remain mobile.

Devices comprising the fourth category of prior art for consideration feature bases designed such that the weight for securing the connection point is provided by the animal being restrained. As with the first and third categories differentiated above, the base of the device is intended to remain stationary, once deployed. Several devices of this nature have been proposed—for example, U.S. Pat. No. 6,412,442 to Bean, which uses the animal's/retrainee's own weight as the anchor for the device. Bean teaches of a cable attached to the center of a portable platform. Since the cable is shorter than the size of the platform, the animal cannot move past the boundary of the platform and thus its weight remains on the platform keeping the platform from moving from it's deployed location. U.S. Pat No. 5,894,748 and U.S. Pat. No. 6,499,436 B1 were both issued to Capperrune. Both of the Capperrune devices use the animals weight as the method of weighing down the base for containing the animal. Thus, not only is the device immobile, but also the distance the animal may roam is greatly limited by the area of the base used. Again, this fourth category is intended to be immoveable by the animal after it is deployed. The present invention, Cat Can't Jump, is designed only to deter vertical motion by disturbing the cat's balance once its paws leave the ground. Cat Can't Jump was developed with the intention that the pet can remain mobile.

Taking all of this information into account, none of the prior art provides the animal with the same abilities of movement while deterring vertical movements as does the current invention, Cat Can't Jump.

SUMMARY

An apparatus of the present disclosure limits the Cat's ability to jump by disturbing their balance, while allowing the cat to move freely about the non-elevated areas of the yard or other area. An animal restraint (10) is comprised of a lead (14), having a length greater than the height of the cat and less than the length of the cat, with a device (12) for attaching to the cat's collar or harness on one end and a weight (13), light enough to lift into the air and swing freely when the cat jumps, attached to the other end to provide the animal with some free roaming ability while deterring them from jumping onto furniture or over fences or after birds.

OBJECTS AND ADVANTAGES

Several objects and advantages of the present invention are to provide an animal restraint that is:
(1) not attached to a fixed location;
(2) capable of restraining the animal without the installation of a special enclosure;
(3) capable of deterring small animals from jumping onto undesired objects;
(4) capable of deterring small animals from jumping over obstacles such as fences; and
(5) not likely to destroy flowers or other property.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

Figure 1:
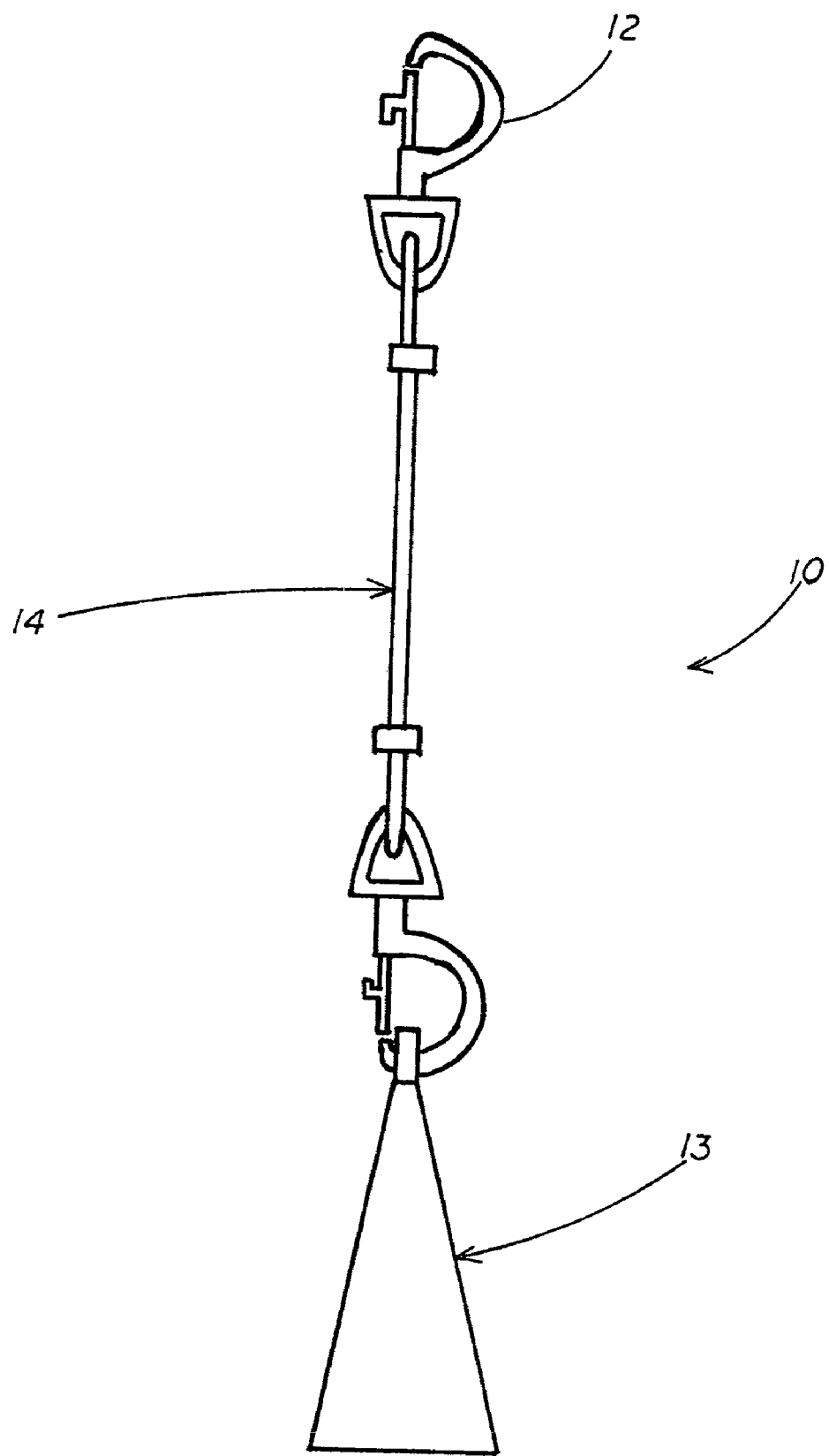
FIG. 1 is a side plan view of a specific exemplary embodiment of an apparatus of the present disclosure.

An apparatus of the present disclosure is designed to solve the problem of small animals, and cats in particular, jumping onto furniture or over fences or after birds. By training the cat not to jump and deterring the cat from jumping over the fence, the present invention allows the cat to roam freely about the backyard. This free roaming feature allows the animal to feel free. Additionally, the free roaming characteristic prevents tangles that come from fixed end devices, such as those represented in the prior art. The present invention doesn't prevent the animal's vertical motion, but instead disturbs the balance of the animal once it attempts vertical movement. This unbalancing is a major deterrent to continuing the jumping behavior. The present invention is also set apart from previous art in that it does not require the installation of a special enclosure and it can be used indoors.

A specific exemplary embodiment of an apparatus of the present disclosure is connected to a collar or harness worn by a cat has a tether line having a proximal end and a distal end and further having a length greater than the height of the cat and less than the length of the cat. A first connector attached to the distal end of the tether is connectable to a weight. A second connector attached to the proximal end of the tether is connectable to the collar or harness of the cat. The is weight selectively connected to the first connector, wherein the weight is light enough that, upon connection of the second connector to the collar or harness worn by the cat, the weight lifts into the air when the cat jumps higher than the length of the tether such that the weight momentarily swings free on the tether whereby the cat becomes unbalanced and fails to land squarely. This unbalanced landing is sufficiently disturbing to the cat that the cat quickly ceases to attempt to jump. Accordingly, once the cat has become discouraged from jumping the apparatus may be detached from the animal.

Cat Can't Jump achieves its useful function by using a cable or flexible length that is long enough for the weight to lay on the ground when the cat is sitting or walking, but the bag will leave the ground when the cat attempts to stand on its hind legs or jump. To achieve this characteristic the cable cannot exceed the length of the cat' body as measured from the front of its shoulders to the end of its haunches. Additionally, the length of the cable must exceed the height of the cat from the top of its front shoulders to the ground. The second important feature of the Cat Can't Jump is the amount of weight to be used. The weight is light enough to allow it to be elevated from the ground by the force of the cat standing on its hind legs, but is heavy enough to create a pendulum style swinging motion once it leaves the ground. It is the pivoting and swinging motion of the weight that disturbs the cats balance when in these horizontal positions that causes the behavioral change. A weight that is more than 10% of the cats weight, but less than 20% of the cat's weight can achieve this purpose.

Figure 2:
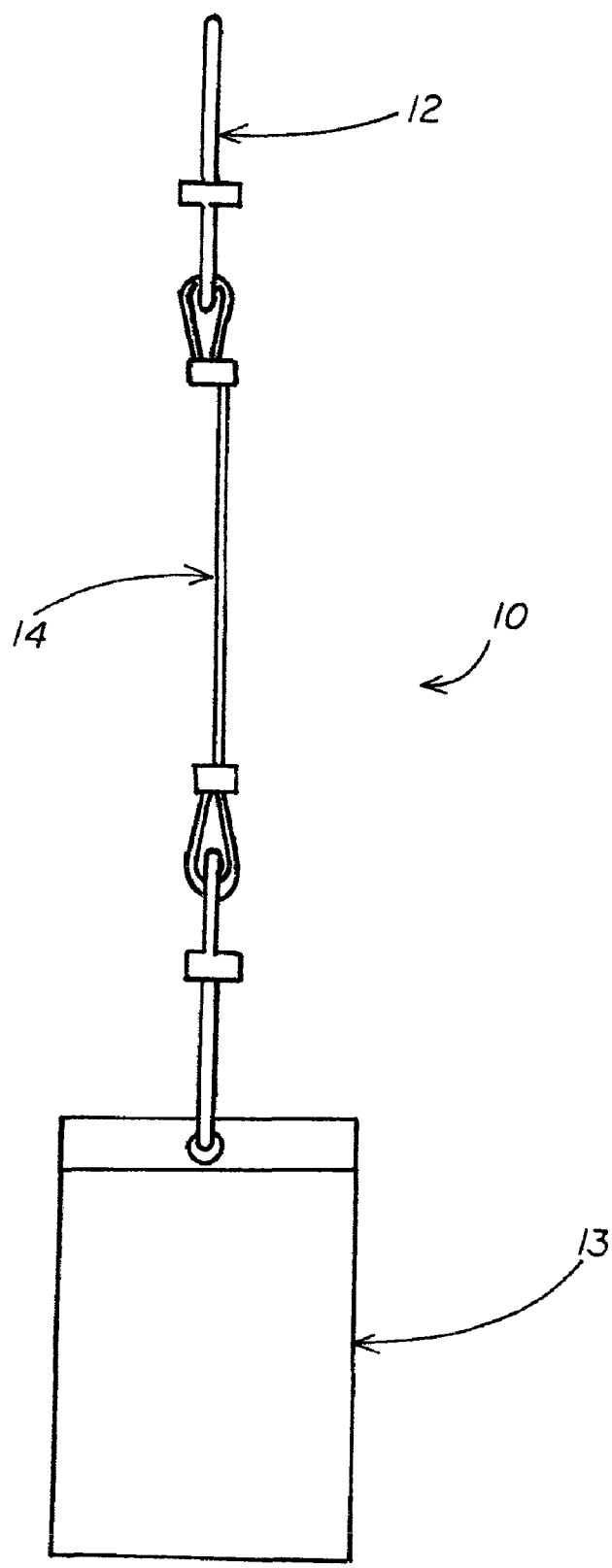
FIG. 2 is a top perspective view of a specific exemplary embodiment of an apparatus of the present disclosure.

Cats have an uncanny ability to nearly always land on their feet after a jump, but with Cat Can't Jump their balance is disturbed causing them to struggle with their landings. This disruption makes the cat not as interested in standing and jumping. A typical embodiment of the animal restraint 10 is shown in FIG. 1 and FIG. 2. The figures illustrate the animal restraint 10 comprised of a lead 14 with a device 12 for attaching to the animal's collar or harness on one end. A weight 13 is attached to the other end of the lead 14 to provide restriction of movement to prevent the animal from jumping onto furniture or over fences. Lead 14 is made of a strong flexible material. The weight 13 has several embodiments and is shown here as a weighted bag.

Figure 3:
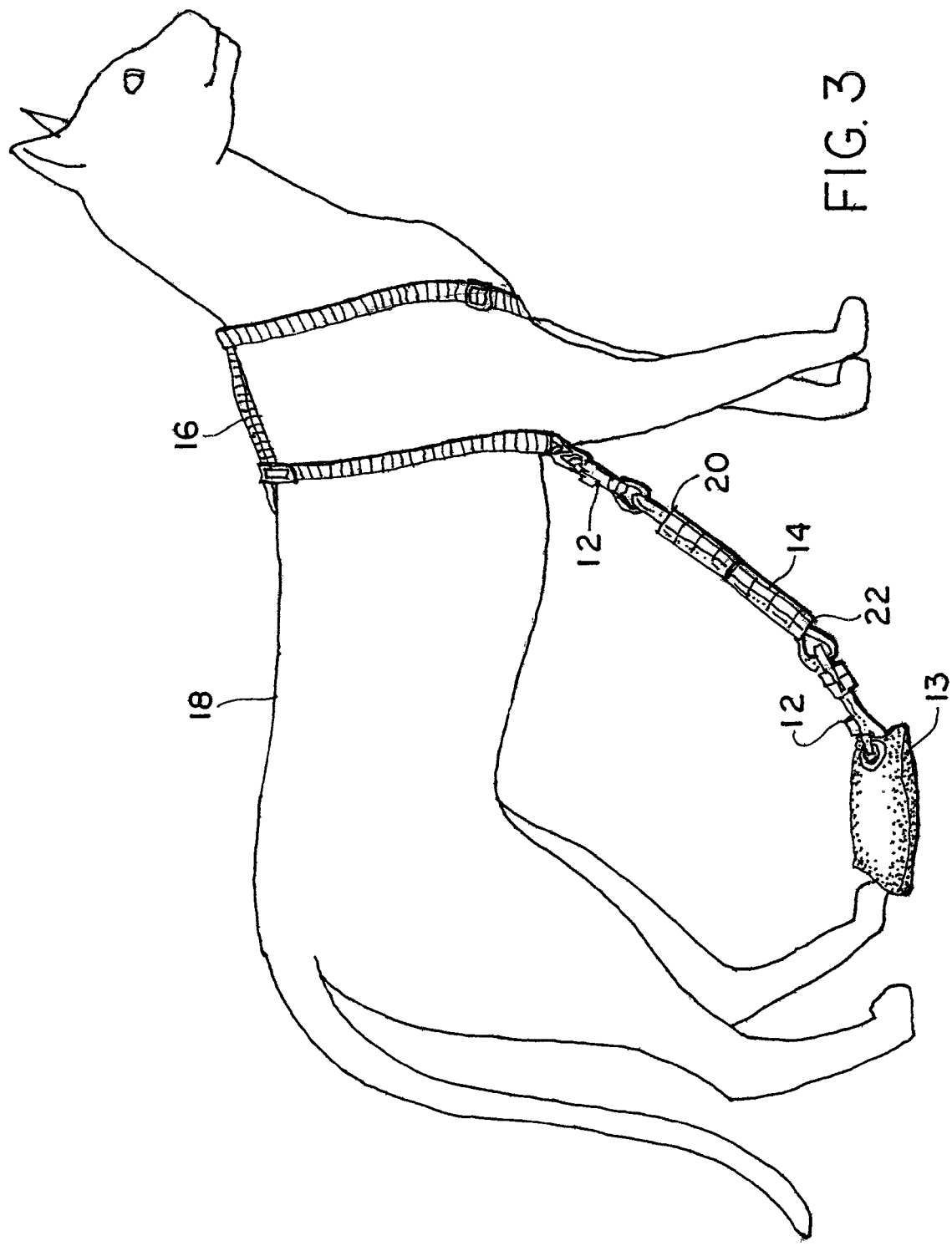
FIG. 3 is an illustration of a specific exemplary embodiment of an anti-jumping restraint of the present disclosure worn by a standing cat.

FIG. 3 is an illustration of a specific exemplary embodiment of an anti-jumping restraint of the present disclosure worn by a standing cat. Apparatus 10 is able to be connected to a collar or harness 16 worn by a cat 18 with connectors 12. Tether line 14 has a proximal end 20 and a distal end 22 and further having a length greater than the height of the cat 18 and less than the length of the cat 18. First connector 12 attached to the distal end of the tether is selectively connected to weight 13 and second connector 12 attached to the proximal end 20 of the tether 14 is selectively connected to harness 16.

Figure 4:
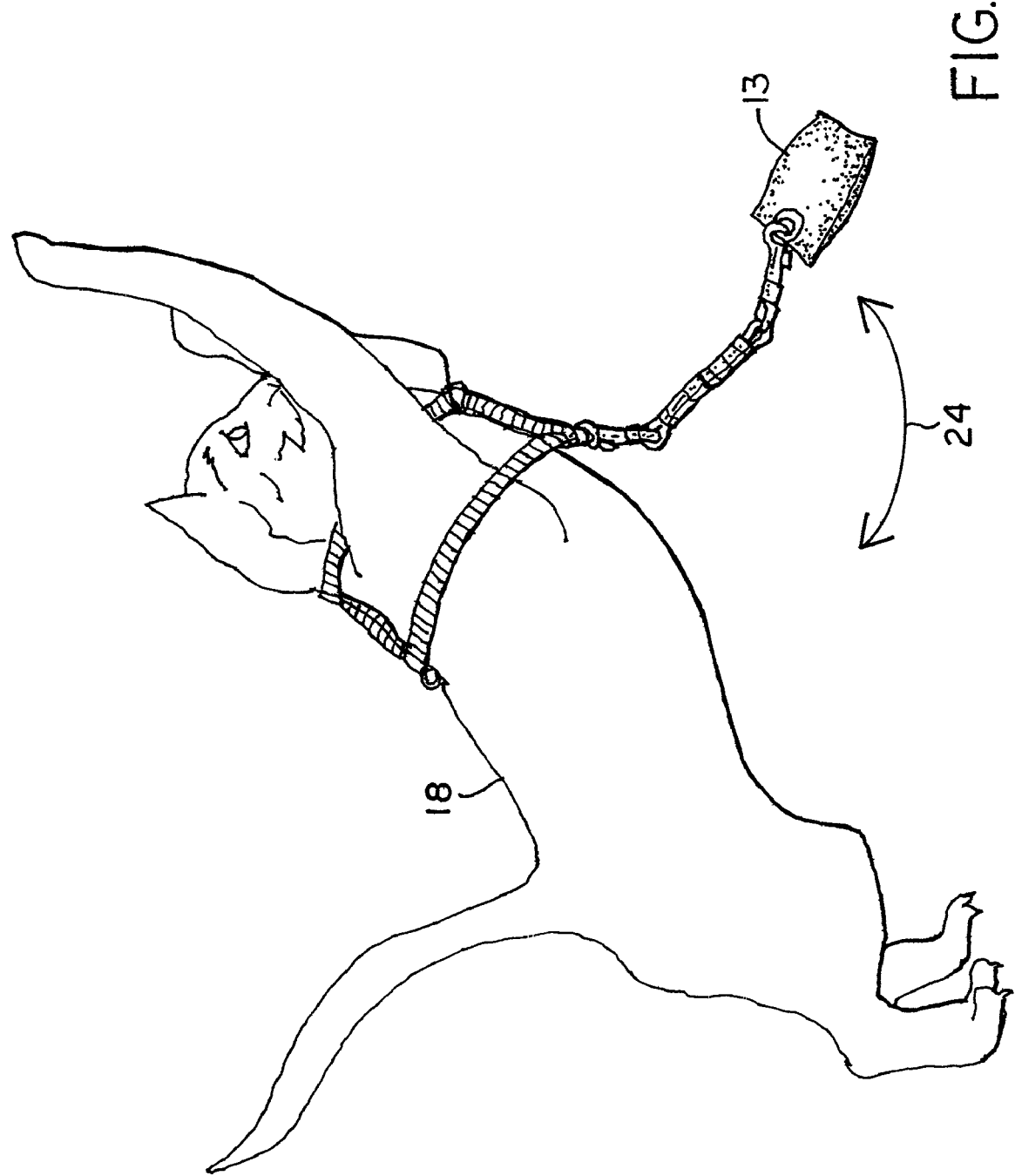
FIG. 4 is an illustration of a specific exemplary embodiment of an anti-jumping restraint of the present disclosure worn by a cat in the process of jumping.

FIG. 4 is an illustration of a specific exemplary embodiment of an anti-jumping restraint of the present disclosure worn by a cat in the process of jumping. Weight 13 selectively connected to the first connector 12, is light enough that, when connected to the second connector 12 to the collar or harness 16 worn by the cat, weight 13 lifts into the air when the cat jumps higher than the length of the tether such that the weight momentarily swings free on the tether as illustrated by the double arrow 24 whereby the cat becomes unbalanced and fails to land squarely.

A specific exemplary embodiment of a method of the present disclosure for training a cat not to jump includes the steps of: (a) providing an apparatus 10 having: a tether line 14 having a proximal end 20 and a distal end 22 and further having a length greater than the height of the cat 18 and less than the length of the cat 18; a first connector 12 attached to the distal end 22 of the tether 14; a second connector 12 attached to the proximal end 20 of the tether; a weight 13 selectively connected to the first connector 12, wherein the weight 13 is light enough that, upon connection of the second connector to the collar or harness 16 worn by the cat 18, the weight 13 lifts into the air when the cat jumps higher than the length of the tether such that the weight momentarily swings free 24 on the tether 14 whereby the cat 18 becomes unbalanced and fails to land squarely; (b) attaching the apparatus 10 to a cat 18; and (c) releasing the cat 18.

Specific exemplary embodiments of the method also include the step of detaching the apparatus 10 after the cat 18 has become discouraged from jumping.

REFERENCE NUMBERS IN DRAWINGS

10 Cat Can't Jump device
12 attaching device connecting 14 to pet's collar or harness
13 weight connected to 14
14 flexible lead or tether
16 cat harness or collar
18 Cat
20 Proximal end of tether 14
22 Distal end of tether 14
24 free swinging motion of weight 13.

OPERATION OF THE INVENTION

To use the Cat Can't Jump device 10, the following steps should be taken:

(1) Ensure that the animal is accustomed to wearing a collar or harness
(2) Attach the device 10 to the animal's collar or harness using attaching device 12
(3) Release animal The Cat Can't Jump device 10 can be used for extended periods of time since it only limits the animal's jumping ability, but doesn't immobilize the animal.

CONCLUSION, RAMIFICATIONS, AND SCOPE OF INVENTION

Thus the reader can see that the Cat Can't Jump device 10 provides many advantages over conventional animal restraints. By eliminating the fixed end, the animal will not become entangled in obstructions such as trees, bushes or play equipment. Providing cats the ability to roam around as if they are free which increases the health of the cat. The weight deters the cat from jumping by disturbing its balance during vertical motion, thus removing the enjoyment of jumping and helping to prevent the cat from becoming a stray. The weight also can be used indoors to train the animal not to jump on counters, tables and other furniture, without penning the animal in an uncomfortable box.

While the above description contains many specificities, these should not be construed as limitations on the scope of the invention, but rather as an exemplification of one preferred embodiment thereof. Many other variations are possible. For example the lead 14 could be connected directly to the weight 13, or by an additional fastener. Also, the weight 13 can be of many different shapes, sizes, weights or other configurations. Without further analysis, the foregoing will so fully reveal the essence of the Cat Can't Jump device 10 that others can, by applying current knowledge, readily adapt it for various applications without omitting features that, from the standpoint of prior art, fairly constitute essential characteristics of the generic or specific aspects of this invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. Thus the scope of the disclosure should be determined by the appended claims and their legal equivalents, rather than by the examples given. It will be understood that each of the elements described above, or two or more together may also find a useful application in other types of methods differing from the type described above.

What is claimed is:

1. An apparatus to be connected to a collar or harness worn by a cat, the apparatus comprising:
   a) a tether line having a proximal end and a distal end and further having a length greater than the height of the cat from the top of the cat's shoulders to the ground and less than the length of the cat from the front of the cat's shoulders to the end of the cat's haunches;
   b) a first connector attached to the distal end of the tether;
   c) a second connector attached to the proximal end of the tether;
   d) a weight that is more than 10% of the cat's weight, but less than 20% of the cat's weight, selectively connected to the first connector, wherein the weight is light enough that, upon connection of the second connector to the collar or harness worn by the cat, the weight lifts into the air when the cat jumps higher than the length of the tether such that the weight momentarily swings free on the tether whereby the cat becomes unbalanced and fails to land squarely.

2. A method of training a cat not to jump, the method comprising the steps of:
   (a) providing an apparatus comprising:
      a tether line having a proximal end and a distal end and further having a length greater than the height of the cat from the top of the cat's shoulders to the ground and less than the length of the cat from the front of the cat's shoulders to the end of the cat's haunches;
      a first connector attached to the distal end of the tether;
      a second connector attached to the proximal end of the tether;
      a weight that is more than 10% of the cat's weight, but less than 20% of the cat's weight, selectively connected to the first connector, wherein the weight is light enough that, upon connection of the second connector to the collar or harness worn by the cat, the weight lifts into the air when the cat jumps higher than the length of the tether such that the weight momentarily swings free on the tether whereby the cat becomes unbalanced and fails to land squarely;
   (b) attaching the apparatus to a cat; and
   (c) releasing the cat.

3. The method of claim 2, further comprising the step of detaching the apparatus after the cat has become discouraged from jumping.

* * * * *